(12) United States Patent
Kakani et al.

(10) Patent No.: US 10,616,044 B1
(45) Date of Patent: Apr. 7, 2020

(54) EVENT BASED SERVICE DISCOVERY AND ROOT CAUSE ANALYSIS

(71) Applicant: CA, Inc., New York, NY (US)

(72) Inventors: Balram Reddy Kakani, Hyderabad (IN); Ravindra Kumar Puli, Hyderabad (IN); Smrati Gupta, San Jose, CA (US)

(73) Assignee: CA, Inc., New York, NY (US)

( * ) Notice: Subject to any disclaimer, the term of this patent is extended or adjusted under 35 U.S.C. 154(b) by 1 day.

(21) Appl. No.: 16/145,553

(22) Filed: Sep. 28, 2018

(51) Int. Cl.
| | |
|---|---|
| H04L 12/24 | (2006.01) |
| G06F 9/54 | (2006.01) |
| G06F 11/07 | (2006.01) |
| H04L 12/26 | (2006.01) |

(52) U.S. Cl.
CPC ............ *H04L 41/065* (2013.01); *G06F 9/542* (2013.01); *G06F 11/079* (2013.01); *G06F 11/0709* (2013.01); *H04L 41/0645* (2013.01); *H04L 41/0677* (2013.01); *H04L 41/22* (2013.01); *H04L 43/16* (2013.01)

(58) Field of Classification Search
CPC ... H04L 41/065; H04L 43/16; H04L 41/0677; H04L 41/22; H04L 41/0645; G06F 11/0709; G06F 11/079; G06F 9/542
See application file for complete search history.

(56) References Cited

U.S. PATENT DOCUMENTS

| | | | | |
|---|---|---|---|---|
| 2010/0036939 | A1* | 2/2010 | Yang | ................... H04L 41/0631 709/224 |
| 2014/0279797 | A1 | 9/2014 | Dang et al. | |
| 2015/0033086 | A1 | 1/2015 | Sasturkar et al. | |
| 2019/0097873 | A1* | 3/2019 | Nucci | ................. G06F 11/3447 |
| 2019/0340041 | A1* | 11/2019 | Banisadr | ................. G06F 9/542 |

OTHER PUBLICATIONS

EMC, "EMC Smarts MPLS Manager Innovative Technology for MPLS/VPN Management", [online] retrieved on Jun. 25, 2018 from <https://www.emc.com/collateral/hardware/white-papers/s0055-smarts-mpls.pdf>, 11 pages, Dec. 2005.
Monolith Software, "AssureNow Fault Management", [online] retrieved on Jun. 25, 2018 from <http://s3.lightboxcdn.com/vendors/a214d1d0-de42-4389-be2d-bdce245fb0ef/uploads/1d36b911-81bb-40b4-b6e0-98e608d62099/AssureNowFaultManagement.pdf>, 3 pages.

* cited by examiner

*Primary Examiner* — Michael A Keller
(74) *Attorney, Agent, or Firm* — Foley & Lardner LLP (57) ABSTRACT

A system uses event correlation to identify components belonging to a same service or service domain. The system correlates events by generating covariance matrices or by performing sequence mining with temporal databases in order to discover event patterns that occur sequentially in a fixed time window. Components corresponding to the correlated events are identified as being part of a same service domain and can be indicated in a service domain data structure, such as a topology. The system utilizes the identified service domains during root cause analysis. The system can determine an anomalous event occurring a lowest layer component in a service domain as a root cause or can determine an anomalous event which occurs first in an identified event sequence of a service domain as a root cause. After identifying the root cause event, the system suppresses notifications of events occurring at other components in the service domain.

21 Claims, 6 Drawing Sheets

EVENT BASED SERVICE DISCOVERY AND ROOT CAUSE ANALYSIS

BACKGROUND

The disclosure generally relates to the field of information security, and more particularly to software development, installation, and management.

Information related to interconnections among components in a system is often used for root cause analysis of system issues. For example, a network administrator or network management software may utilize network topology and network events to aid in troubleshooting issues and outages. Network topology describes connections between physical components of a network and may not describe relationships between software components. Events are generated by a variety of sources or components, including hardware and software. Events may be specified in messages that can indicate numerous activities, such as an application finishing a task or a server failure.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details or be practiced in other environments. For instance, this disclosure refers to performing root cause analysis using identified service domains in illustrative examples. Aspects of this disclosure can be also applied to using identified service domains for determining single points of failure in a system or identifying other weaknesses, such as load balancing issues, for a system. In other instances, well-known instruction instances, protocols, structures and techniques have not been shown in detail in order not to obfuscate the description.

Introduction

Without knowledge of a system, detecting relationships across domains for components of a service can be difficult in the absence of topology information. While some techniques for cross domain correlation of components are available, these require significant effort to pre-load or pre-define the correlation scope. Additionally, some forms of cross domain correlation are very limited in which domains they can operate and may still require some front-end design or hard coding by experts to function properly. These hard-coded correlation techniques fail when deployed to new domains (or new network configurations or network technologies).

Overview

To provide improved identification of service components and root cause analysis, a system uses event correlation to identify components belonging to a same service or service domain. The system correlates events by generating covariance matrices or by performing sequence mining with temporal databases in order to discover event patterns (or episodes of events) that occur sequentially in a time window. Components corresponding to the correlated events are identified as being part of a same service domain and can be indicated in a service domain data structure, such as a topology. The system utilizes the identified service domains during root cause analysis. The system can determine an anomalous event occurring a lowest layer component in a service domain as a root cause or can determine an anomalous event which occurs first in an identified event sequence of a service domain as a root cause. After identifying the root cause event, the system suppresses notifications of events occurring at other components in the service domain to avoid providing superfluous notifications through network management software to an administrator.

Terminology

The term "component" as used in the description below encompasses both hardware and software resources. The term component may refer to a physical device such as a computer, server, router, etc.; a virtualized device such as a virtual machine or virtualized network function; or software such as an application, a process of an application, database management system, etc. A component may include other components. For example, a server component may include a web service component which includes a web application component.

The description below refers to an "event" to describe a message, indication, or notification of an event. An event is an occurrence in a system or in a component of the system at a point in time. An event often relates to resource consumption and/or state of a system or system component. As examples, an event may be that a file was added to a file system, that a number of users of an application exceeds a threshold number of users, that an amount of available memory falls below a memory amount threshold, or that a component stopped responding or failed. An event indication can reference or include information about the event and is communicated to by an agent or probe to a component/agent/process that processes event indications. Example information about an event includes an event type/code, application identifier, time of the event, severity level, event identifier, event description, etc.

The description below refers to correlating events or event correlation. The process of event correlation involves identifying events that have a connection or relationship to one another, such as a temporal connection, cause-and-effect relationship, statistical relationship, etc. Correlating events or event correlation as used herein refers to the identification of this existing relationship and does not include modifying events to establish a connection or relationship.

The description below uses the term "service domain" to refer to a collection of resources or components which are utilized in providing a service, such as an application, a database, a web server, etc. For example, a service domain can include a cloud storage application, a virtual machine which executes the application, a hypervisor underlying the virtual machine, a server hosting the hypervisor, and a router which connects the server to a network.

Example Illustrations

Figure 1:
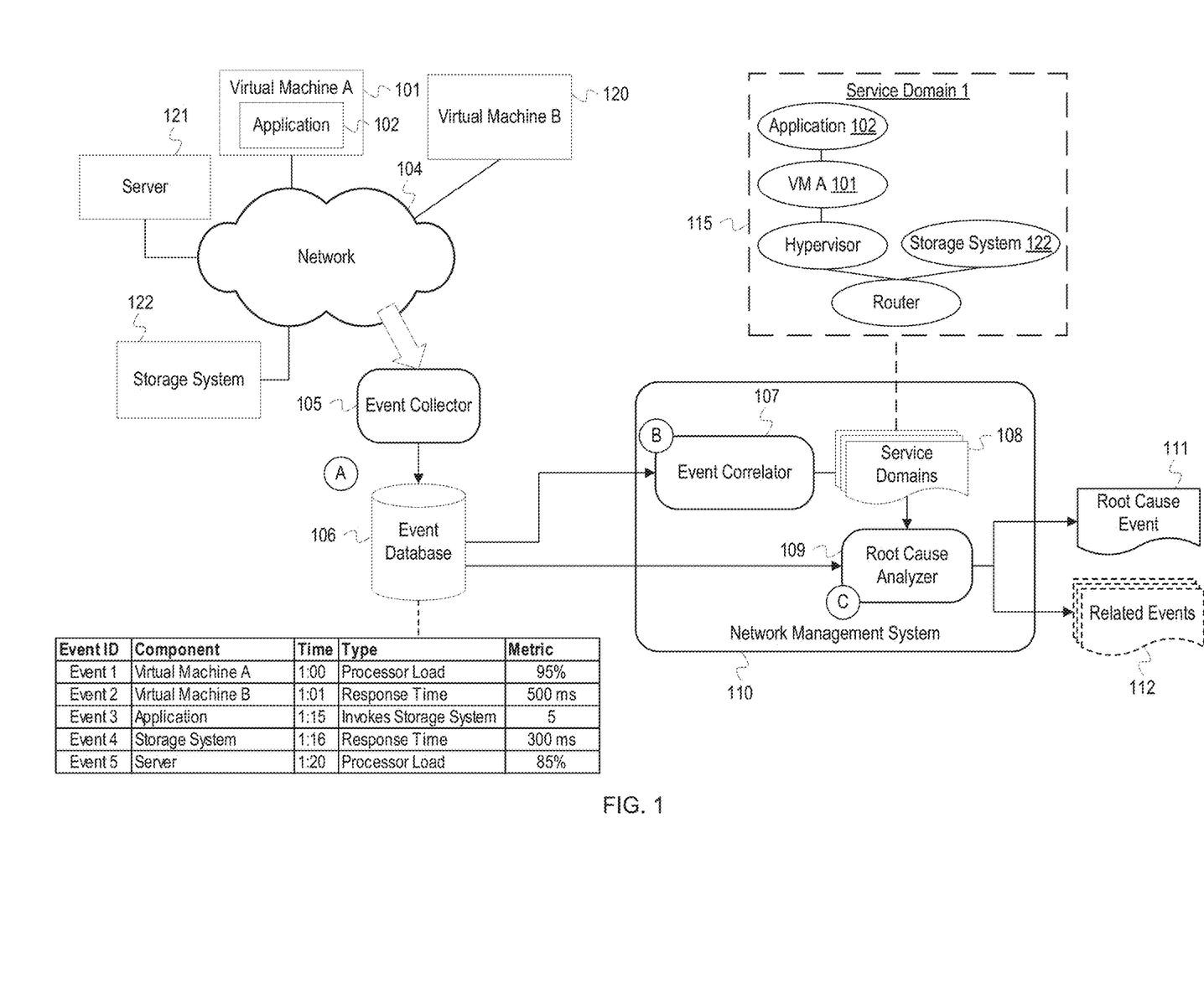
FIG. 1 depicts an example network management system which performs event-based identification of service domains and root cause analysis.

FIG. 1 depicts an example network management system which performs event-based identification of service domains and root cause analysis. FIG. 1 depicts a virtual machine A 101, a virtual machine B 120, a server 121, a storage system 122, and an event collector 105 that are connected through a network 104. The virtual machine A 101 includes an application 102. FIG. 1 also depicts a network management system 110 that includes an event correlator 107 and a root cause analyzer 109. The event collector 105, the event correlator 107, and the root cause analyzer 109 are communicatively coupled to an event database 106.

At stage A, the event collector 105 receives events from components in the network 104 and stores them in the event database 106. The event collector 105 may receive the events from agents of the components in the network 104. In FIG. 1, the event collector 105 receives Events 1-5 and stores them in the event database 106. Event 1 indicates that the processor load for the virtual machine A 101 was at 95% at time 1:00, and Event 2 indicates that the response time for the virtual machine B 120 was 500 milliseconds at time 1:01. Event 3 indicates that the application 102 invoked the storage system 122 five times at time 1:15, and Event 4 indicates that the storage system 122 had a response time of 100 milliseconds at time 1:16. Event 5 indicates that the server 121 had a processor load of 85% at time 1:20. The event indications may include additional information that is not depicted. For example, Event 1 may indicate that the processor load is an average for a certain time period and may include a minimum and maximum load for the time period. Events 1-5 are examples of particular types of event indictors that may be received by the event collector 105. The event collector 105 also receives and stores event indications of other types in the event database 106 that are not depicted.

At stage B, the event correlator 107 retrieves and correlates events in the event database 106 to identify components for service domains 108. Event correlation refers to the identification of a relationship or statistical connection between two or more events. Events can be correlated based on a determination that a first event caused a second event, that a first series of events caused a second series of events, that two events often occur near simultaneously, etc. The event correlator 107 can also correlate events based on a statistical, causal, or probability analysis using a statistical correlation/covariance matrix, as described in more detail in FIG. 3. The event correlator 107 can also correlate events based on sequence mining or identification of repetitive event patterns (i.e., temporally sequential series of events), as described in more detail in FIG. 4. In FIG. 1, for example, the event correlator 107 may determine that there is a correlation between the event 3 in which the application 102 invokes the storage system 122 and the event 4 which occurs a minute later and indicates a slow response time at the storage system 122. The event correlator 107 can validate correlations over multiple time periods. For example, the event correlator 107 may increase a correlation probability based on identifying a pattern in past events indicating that an event with a slow response time for the storage system 122 frequently occurs after events indicating invocations of the storage system 122 by the application 102.

A correlation between events indicates a relationship between the corresponding components. Event correlation can reveal component relationships which may not be apparent from network topology information, and these relationships can be identified without requiring extensive manual input by an administrator. The event correlator 107 uses the determined relationships to identify components which are part of a same service domain. The event correlator 107 indicates the components in the service domains 108 which includes the example service domain 1 115. As shown in FIG. 1, the service domain 1 115 includes the application 102, the virtual machine A 101, the storage system 122, a hypervisor, and a router which may also be part of the network 104. The event correlator 107 included these components in a same service domain based on determining a correlation between events of these components, such as the example correlation described above between events of the application 102 and the storage system 122. Additionally, the event correlator 107 may have included the router, a physical layer component, in the service domain 1 115 based on determining that the router was utilized by logical layer components such as the application 102. Relationships between physical and logical layer components can be identified using a reverse lookup or through a network topology provided to the event correlator 107. The layer to which a component is assigned may be based on the Open Systems Interconnection model (OSI model). Layers can include multiple components, e.g. routers and switches may be on a same layer. The event correlator 107 can provide the service domains 108 in a graph data structure that includes nodes identifying the components and edges indicating the relationships between the components or may indicate the components in a list. The event correlator 107 can include data in the service domains 108 such as a type of correlation used to identify relationships, a determined probability of correlation, event attribute values, a corresponding network or service layer for each component, etc. If sequence mining was used to identify event correlations, the event correlator 107 can label the graph data structure or otherwise indicate in the service domains 108 a sequence in which events typically occur at the components. For example, the event correlator 107 may label the service domain 1 115 to indicate that an event typically first occurs at the application 102 and then an event occurs at the storage system 122.

At stage C, the root cause analyzer 109 performs root cause analysis using the service domains 108 and events in the event database 106. The root cause analyzer 109 may monitor the event database 106 to identify one or more anomalous events occurring at the components. An anomalous event is an event that indicates a network occurrence or condition that deviates from a normal or expected value or outcome. For example, an event may have an attribute value that exceeds or falls below a determined threshold or required value, or an event may indicate that a component shut down or restarted prior to a scheduled time. Additionally, an anomalous event may be an event that indicates a network issue such as a component failure.

After identifying one or more anomalous events, the root cause analyzer 109 identifies one or more service domains from the service domains 108 which include components corresponding to the anomalous events. The root cause analyzer 109 then utilizes the identified service domain(s) to aid in the root cause analysis process. For example, if an anomalous event, such as a slow response time, occurred at the application 102, the root cause analyzer 109 identifies the service domain 1 115 from the service domains 108. The root cause analyzer 109 then identifies related components in the service domain 1 115 and retrieves events for those components from the event database 106. In one implementation, the root cause analyzer 109 identifies an anomalous event occurring at a lowest layer component in the service domain 1 115 and outputs that event as a root cause event 111. For example, if a high processor load event was occurring at the hypervisor, which is a lower layer component than the application 102, the root cause analyzer 109 prioritizes the high processor load event as the root cause and outputs that event as the root cause event 111. In another implementation, the root cause analyzer 109 may utilize an event sequence or pattern indicated in the service domain 1 115 to identify which component typically starts the series of events resulting in an anomaly. If the event sequence is typically instigated by the application 102, the root cause analyzer 109 outputs an event at the application 102 as the root cause event 111. The root cause analyzer 109 may also output related events 112 which occur at other components in the service domain 1 115; however, as indicated by the dashed lines in FIG. 1, the related events 112 may be hidden or suppressed so that an administrator is not overwhelmed with alarms or notifications of anomalous events or other possible root causes. In general, the root cause analyzer 109 suppresses events generated by the components in the service domain 1 115 while an issue causing the anomalous events is still occurring. The root cause analyzer 109, or another service of the network management system 110, can suppress events by filtering events using identifiers for the components in the service domain 1 115 and preventing the filtered events from being sent for display. Once the issue has been resolved and the components in the service domain 1 115 are functioning properly, the root cause analyzer 109 resumes normal generation of event notifications.

Figure 2:
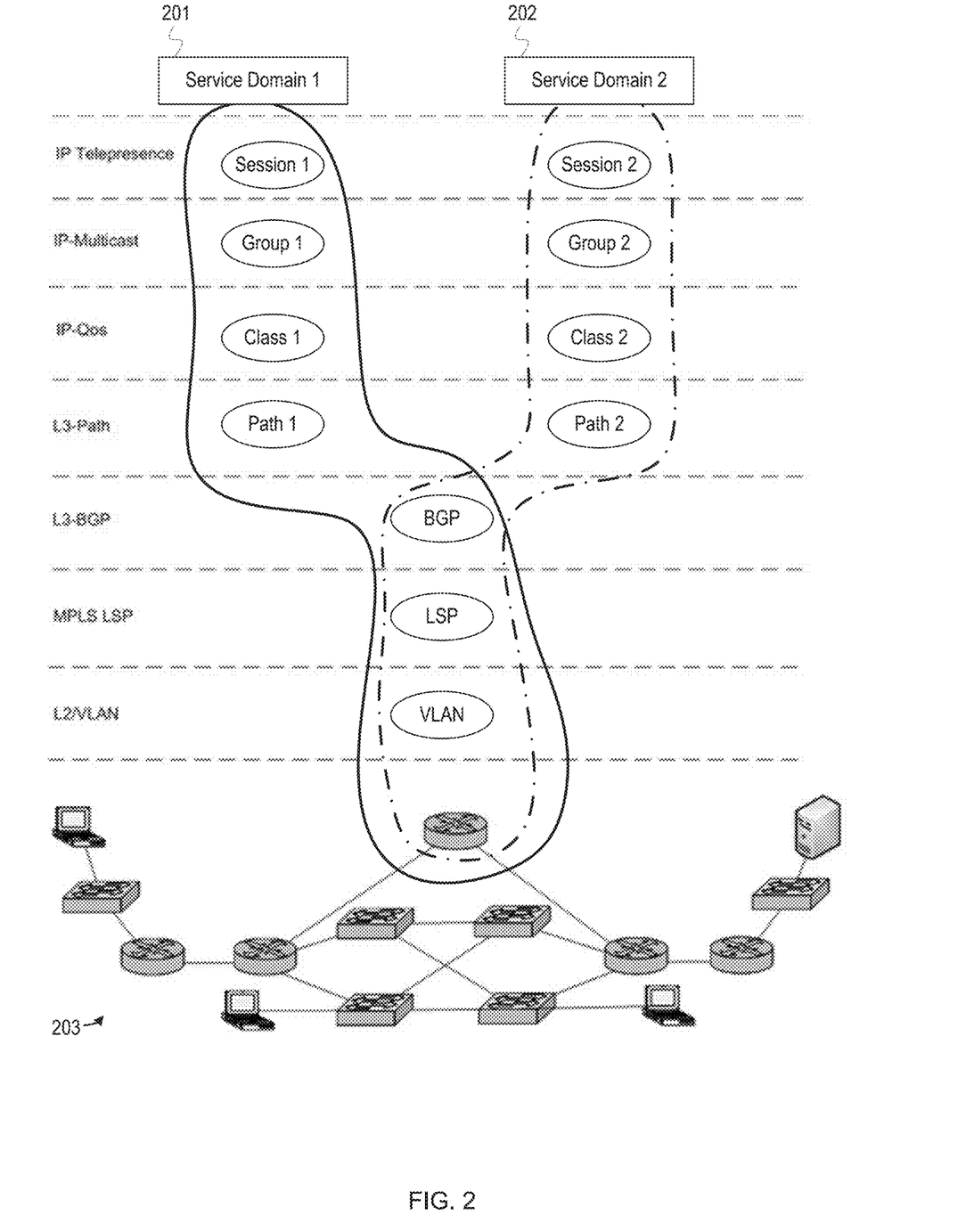
FIG. 2 depicts service domains identified based on event correlation.

FIG. 2 depicts service domains identified based on event correlation. FIG. 2 shows a service domain 1 201 and a service domain 2 202 which each comprise a subset of components executing within different layers of a network 203. The components in the service domains may have been determined to be related based on event correlation through sequence mining or through a covariance matrix. The components are related in that they function together to a provide sessions for an IP telepresence service: the service domain 1 201 includes a session 1 and the service domain 2 202 includes a session 2. These sessions are supported by other components in the network 203 such as IP-multicast groups, IP-quality of service (QoS) classes, and layer-3 (L3) network paths, a border gateway protocol (BGP), multiprotocol label switching paths (MPLS LSP), a virtual local area network (VLAN), and a router.

If the "Session 1" of the service domain 1 201 fails or encounters an issue, root cause analysis of the session can be simplified by limiting the analysis to the components in the service domain 1 201. Additionally, other information about the service domain 1 201 may be utilized to identify a root cause. In one implementation, root causes are inferred based on a lowest layer component in the service domain 1 201 which is experiencing an issue. For example, if the "Group 1" IP-multicast is experiencing an issue and the router is experiencing an issue, it is determined that the router issue is the root cause of problems for the service domain 1 201, as the router is at a lower layer than the IP-multicast. A component's layer can be determined based on a component type, an assigned or logical OSI layer, etc. Additionally, a components layer can be determined relative to other components. For example, a virtual machine is considered a higher layer than the hypervisor on which it executes. Similarly, a server which executes the hypervisor is at a higher layer than a router which it uses for transmitting network traffic.

After determining the root cause, alarms or notifications for other components in the service domain 1 201 can be suppressed, e.g., not displayed to a user. Furthermore, if "Session 2" of the service domain 2 202 is also experiencing issues, alarms or notifications for other components in the service domain 2 202 can also be suppressed and, ultimately, only a single event or notification identifying the root cause is presented, thereby avoiding overloading an interface of network management software with notifications. Events for components of the service domains may be suppressed until the issue is resolved and then event notification may continue as normal.

Figure 3:
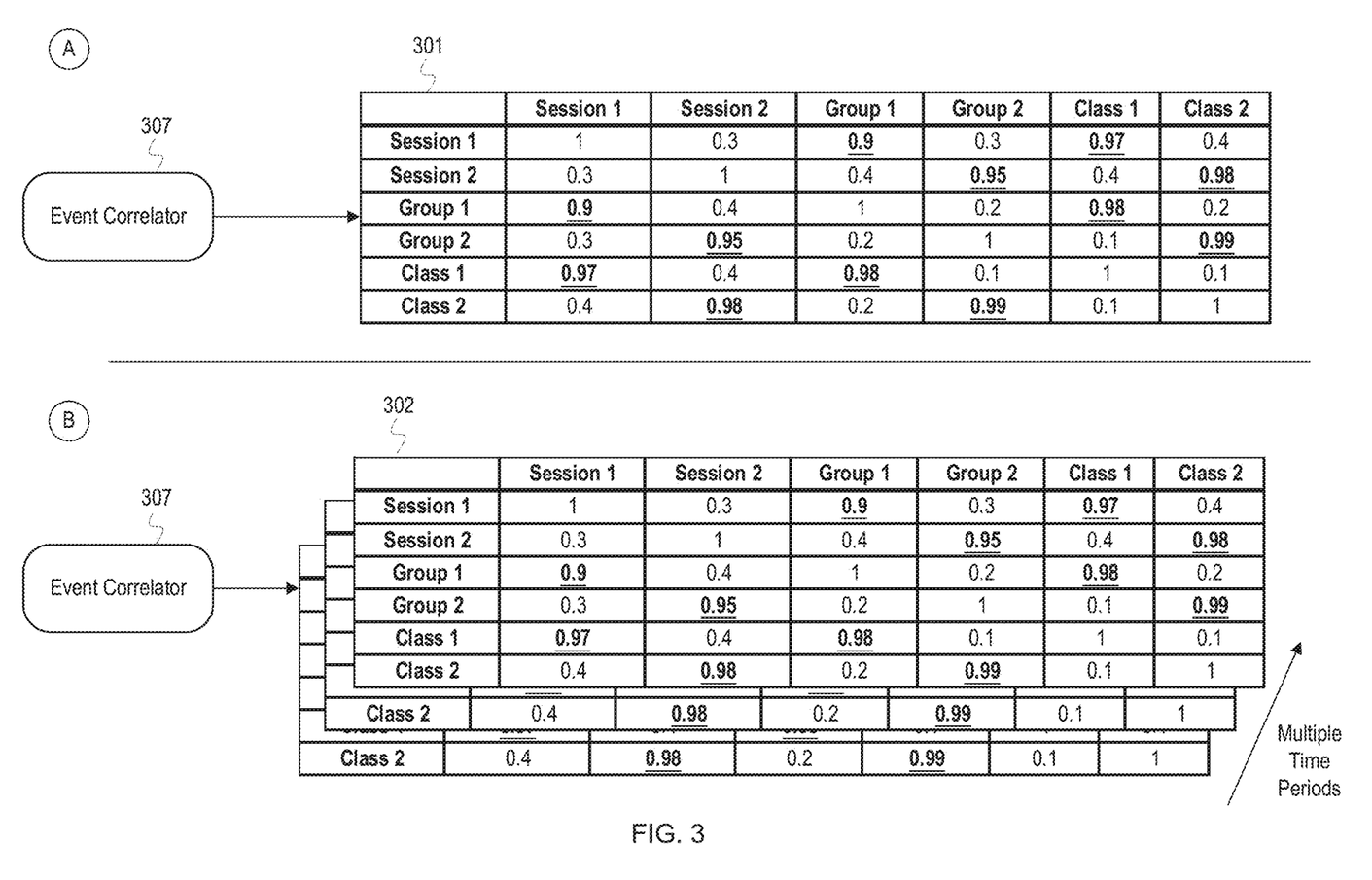
FIG. 3 depicts covariance matrices used to identify relationships between components based on event correlation.

FIG. 3 depicts covariance matrices used to identify relationships between components based on event correlation. FIG. 3 depicts an event correlator 307 which produces a covariance matrix 301 at a stage A and a set of covariance matrices 302 over multiple time periods during a stage B. The columns and rows of the matrices identify components in a network, such as the components depicted in FIG. 2. The entries in the matrices represent the correlation or covariance of events between the components. In probability theory and statistics, covariance is a measure of the joint variability of two random variables. In the case of FIG. 3, the random variables are events occurring at the components. The covariance analysis of the events generates a number between 0 and 1 indicating the probability that there is a correlation between the events, 1 being a high probability and 0 being a low probability. A threshold can be set to determine whether the probability of correlation is high enough to confidently determine that two components are related and belong to a same service domain. In FIG. 3, the threshold is 85%, and the entries in the matrices which satisfy the threshold are bolded and underlined. As seen in the matrix 301, for example, there is a 90% correlation between events of the component "Session 1" and events of the component "Group 1," so the event correlator 307 may determine that the components are part of a same service domain.

At stage A, the event correlator 307 generates a first matrix, the matrix 301, based on event correlation. The event correlator 307 may use events from an event log from a first or most recent time period to generate the matrix 301. For example, the event correlator 307 may use events generated in the previous 10 minutes or events from a first 30 minutes of operation of the components. Since the matrix 301 is based on correlation from just a single time period, the matrix 301 is treated as a hypothesis and is tested/validated as additional events are received and analyzed.

During stage B, the event correlator 307 continues collecting and analyzing events over multiple time periods to generate the set of covariance matrices 302. As additional matrices are generated and correlations identified, the statistical power of the correlations increases, thereby decreasing the risk of making a Type II error. A type II error refers to the failure to reject a false hypothesis; a hypothesis being in this instance that there is a correlation between events of two components as shown in the matrix 301. Statistical power is inversely related to beta where beta is the probability of making a Type II error (power=1−β). The event correlator 307 may continue collecting and analyzing events over multiple time periods until the probability of making a Type II error falls below a threshold or, stated differently, until the statistical power has exceeded a threshold. In general, the consistency with which a correlation is identified over the multiple time periods indicates the confidence which can be place in the identified correlation. For example, if the event correlator generates three matrices over three time periods and a threshold satisfying correlation appears in all three, then the event correlator 307 can have high confidence in the correlation and the correlation likely has high statistical power. After arriving at a statistically sound result, the event correlator 307 can output a matrix based on an aggregation of the set of covariance matrices 302 or a list of related components identified based on the correlation.

Figure 4:
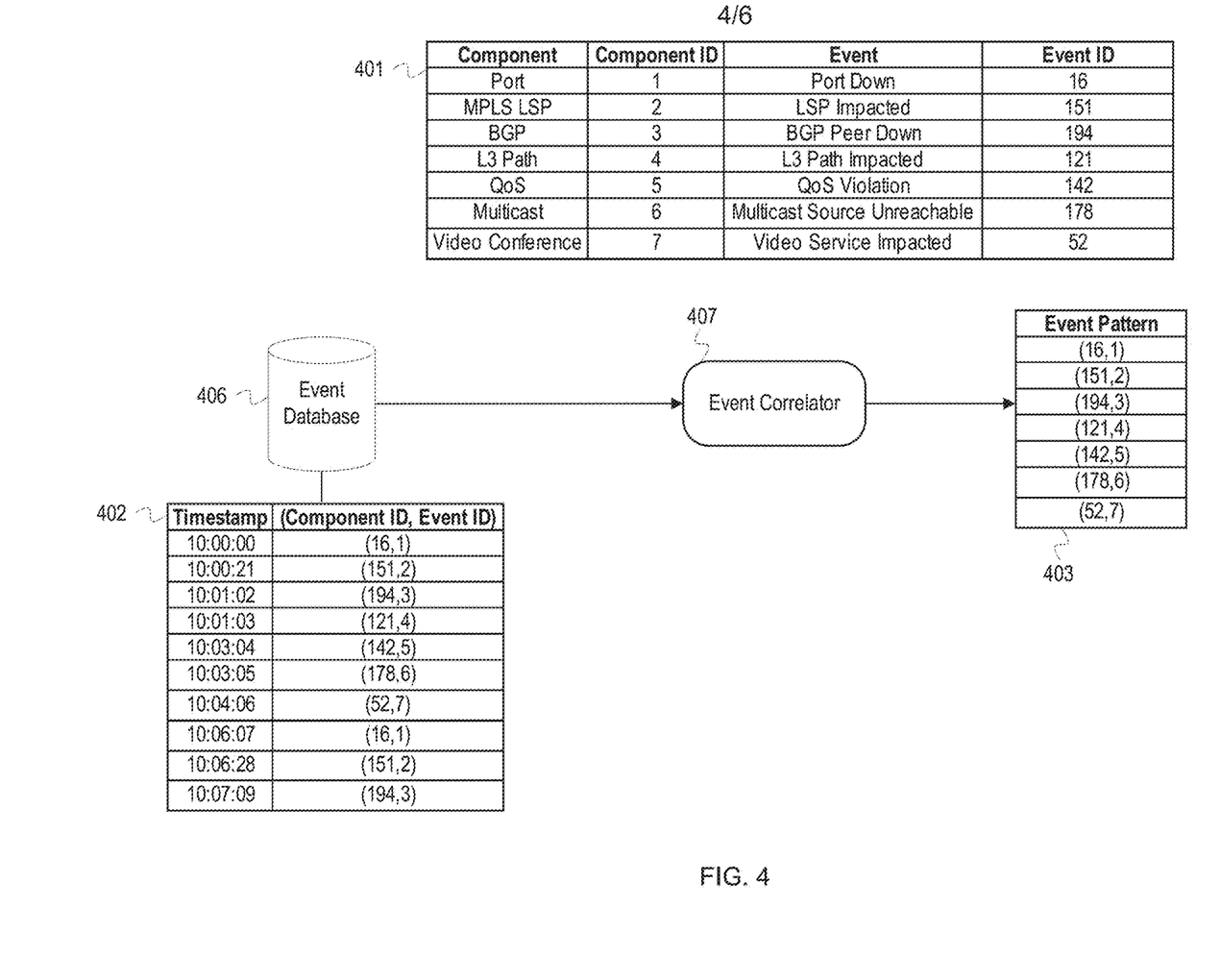
FIG. 4 depicts an example of using event sequence mining to perform event correlation and identify relationships between components.

FIG. 4 depicts an example of using event sequence mining to perform event correlation and identify relationships between components. FIG. 4 depicts an event key 401, event log 402, and a mined pattern 403 generated by an event correlator 407. The event key 401 identifies known entities or components in a system along with their component identifiers. Additionally, the event key 401 identifies types of events for those components along with event identifiers. The event log 402 shows a number of events stored in an event database 406 which have been sorted according to an associated timestamp. Each event indication in the event log 402 indicates a component identifier for the corresponding component and an event identifier for the type of event which occurred. For example, the first event indication in the event log 402 occurred at a component with identifier "1", which, as shown in the event key 401, is the component "port." Additionally, the first event indication has an event identifier of "16" which corresponds to the event type of "port down."

The event correlator 407 uses sequence mining on the temporal listing of events 402 in order to discover the patterns (or episodes of events) that occur sequentially in a fixed time window. This approach allows discovery of patterns which occur repeatedly with a high confidence index thereby making the mined pattern causal and not co-incidental. The event correlator 407 may mine the data using a priori algorithms to identify sequences. If an event pattern or episode is recognized within a specified timeframe with a high confidence index on causality (based on factors like number of repetitions, probabilistic distribution, etc.), then that episode is a set of events that occur one after the other and are correlated. Components associated with that set of events are then indicated as being part of a same service domain.

In FIG. 4, the event correlator 407 mines the event log 402 using a mining algorithm to identify patterns or sequences of events. The sequence mining algorithm may be the Prefix-Span algorithm. As a result of mining the event log 402, the mined pattern 403 is identified. The mined pattern 403 is the longest subsequence which is repeated in the event log 402. The mined pattern 403 may be further processed to determine a confidence index of causality between the events in the mined pattern 403. If there is a high confidence of causality, it is determined that the events and their corresponding components are related and are part of a same service domain. Similar to the covariance matrices, the event correlator 407 may perform the sequence mining over multiple time periods to improve the statistical power of the correlations prior to making a determination that the events in the mined pattern 403, and their corresponding components, are related. The mined pattern 403 is just one example pattern for a service domain. A service domain can include multiple event patterns or sequences involving one or more of the same components and event types. For example, instead of a sequence beginning with the port down event, a sequence may begin with a QoS violation event which causes events at the multicast and video conference components, such as slow response times. When performing root cause analysis, events generated in a service domain can be compared to the one or more event patterns associated with the service domain to determine which pattern is occurring. The identified pattern is then used to determine a root cause of an issue.

Figure 5:
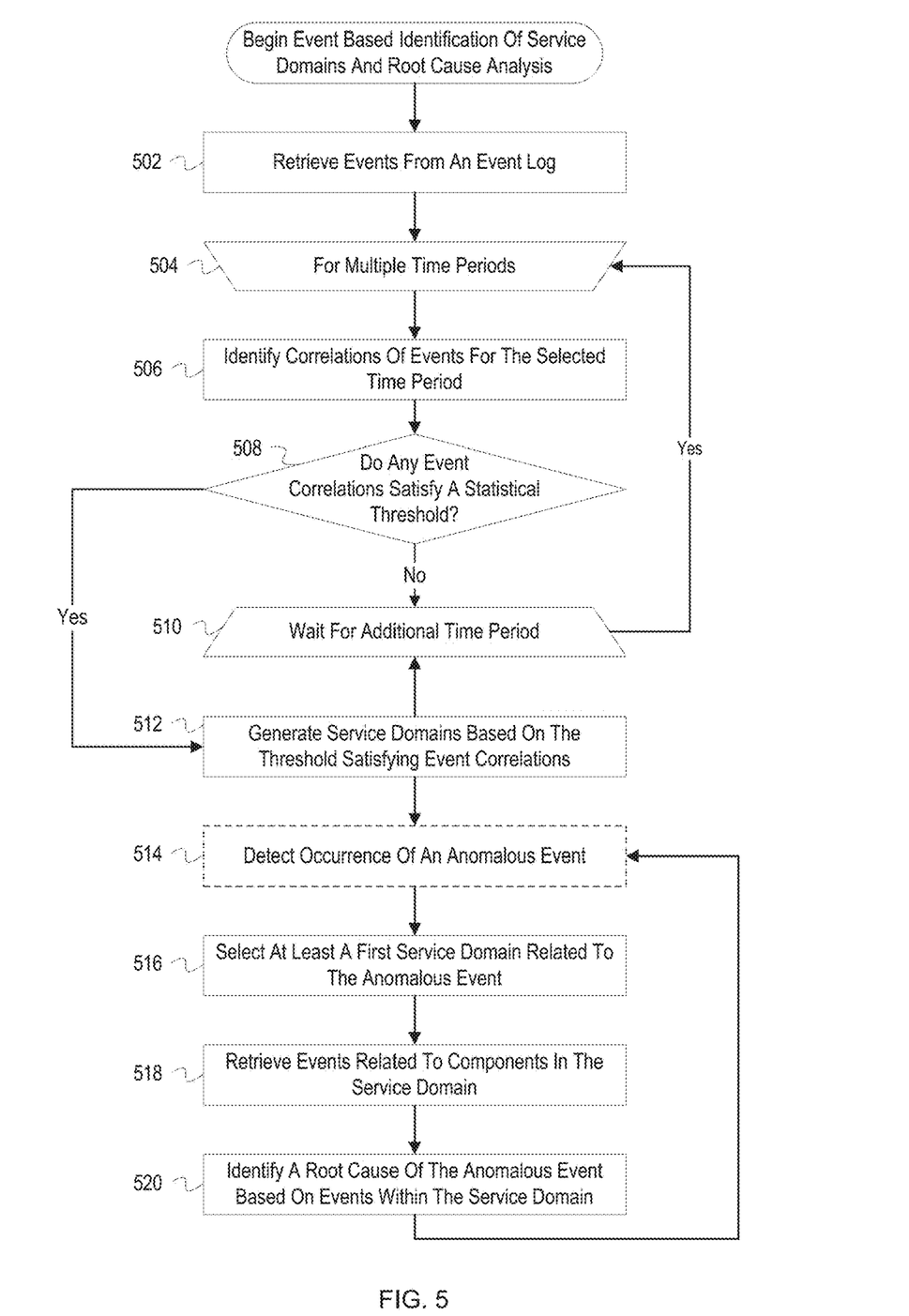
FIG. 5 depicts a flowchart with example operations for performing event-based identification of service domains and root cause analysis.

FIG. 5 depicts a flowchart with example operations for performing event-based identification of service domains and root cause analysis. The operations of FIG. 5 are described as being performed by a network management system for consistency with FIG. 1, although naming of program code can vary among implementations.

A network management system ("system") retrieves events from an event log for analysis (502). The system may query an event database to retrieve events or may subscribe to an event management service which forwards batches of events to the system. The system may sort the events into a chronological order, filter for events of a particular type, or otherwise prepare the collection of events for analysis.

The system begins operations for multiple time periods represented by the events (504). The system may divide or split the events into time periods for processing. For example, the system may split the events into collections of five-minute periods. Alternatively, in some implementations, the system may divide the events into sets of a number of events, e.g., 100 events per set. The time period or collection of events currently being processed is hereinafter referred to as "events for the selected time period."

The system identifies correlations of events for the selected time period (506). The system analyzes the events and may generate a covariance matrix for components represented in the events or perform sequence mining on the events. The system may compare/combine correlations based on the events from the selected time period to correlations generated based on events from previous time periods. The system can then generate a cumulative set of event correlations based on the analysis performed across the different time periods.

The system determines whether any event correlations satisfy a statistical threshold (508). The system may compare values representing a probability of the statistical correlations to one or more thresholds to determine whether any of the correlations have a satisfactory statistical power or confidence. Additionally, as described above, the system may determine whether the probability of making a Type II error has been sufficiently reduced for one or more of the event correlations. For event sequences, the system can determine whether the event sequence has occurred a threshold number of times or a sufficient number of times to satisfy a statistical probability that the sequence is not a random occurrence and represents correlated events.

If no correlations satisfy the threshold, the system waits for an additional time period of events (510). If analyzing events from a log, the system may select a collection of events from a next time period. Alternatively, the system waits until a subsequent time period has elapsed and retrieves events for that time period or waits until another batch of events is received from an event management system. The system then continues operations at block 504.

If there are correlations which satisfy the threshold, the system generates service domains based on threshold satisfying event correlations (512). The system identifies components corresponding to the event correlations and generates a service domain comprising the components. The service domain may be a topology, graph data structure, or a listing which identifies the components as belonging to a same service domain. The system may include information in the service domain data structure such as identified event sequences, service or network layers associated with each of the components, statistical strength of event correlations, etc. After generating at least a first service domain based on the event correlations, the system is prepared to begin root cause analysis utilizing the generated service domain represented by the operations at block 514, 516, 518, and 520. The system also continues refining and validating the event correlations and the generated service domains. For example, the system may add or remove components in the service domains based on additional event correlation. As a result, the system also returns to block 510 to continue performing event correlation in parallel with the root cause analysis operations.

The system detects an occurrence of an anomalous event (514). Block 514 is depicted with a dashed outline to represent that the system continually monitors for the occurrence of anomalous events as a background operation and that the operations of blocks 516, 518, and 520 may be triggered each time an anomalous event is detected. The system may detect an anomalous event by identifying an event which indicate that a component issue or failure has occurred or by comparing metrics in an event to preestablished performance thresholds.

The system selects at least a first service domain related to the anomalous event (516). The system determines component corresponding to the event based on a component identifier or other indicator in the event associated with the component. The system then searches the generated service domains with the component identifier to retrieve one or more service domains which include the component. The system selects at least a first service domain for which to perform root cause analysis but can also perform root cause analysis for all affected service domains in parallel, as the service domains are likely all experiencing a same root cause since the service domains share the anomalous component.

The system retrieves events related to components in the service domain (518). The system identifies all components in the service domain and then queries an event database to retrieve recent events for the components. The system may structure the query to retrieve only anomalous events for the components.

The system identifies a root cause of the anomalous event based on the events within the service domain (520). In one implementation, the system can perform root cause analysis by identifying a lowest layer component in the service domain which is experiencing an anomalous event and identify that component as the root cause. In another implementation, the system may analyze an event sequence indicated in the service domain to identify the earliest event in the sequence which matches an event of one of the components. For example, if the sequence begins with an event of type 3 at a component A, the system determines whether an event of type 3 recently occurred at the component A. The system may continue through the sequence to determine whether there is a matching recent event for each event in the sequence. If there is a matching sequence of events, the system determines that the event at the component corresponding to the first event in the sequence is the root cause. The system outputs the root cause event identified as a result of the analysis and suppresses other alarms or events for the service domain. The system may also perform automated remedial actions to correct the issue. For example, if the root cause event was a router issue, the system may remotely reboot the router or invoke a script for resetting a port on the router. After identifying the root cause, the system returns to block 514 until another anomalous event is detected.

Variations

FIGS. 1 and 3 are annotated with a series of letters. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 506 and 520 of FIG. 5 can be performed in parallel or concurrently. Also, the iteration over multiple time periods may not be necessary if statistically sound correlations can be identified in a single iteration. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
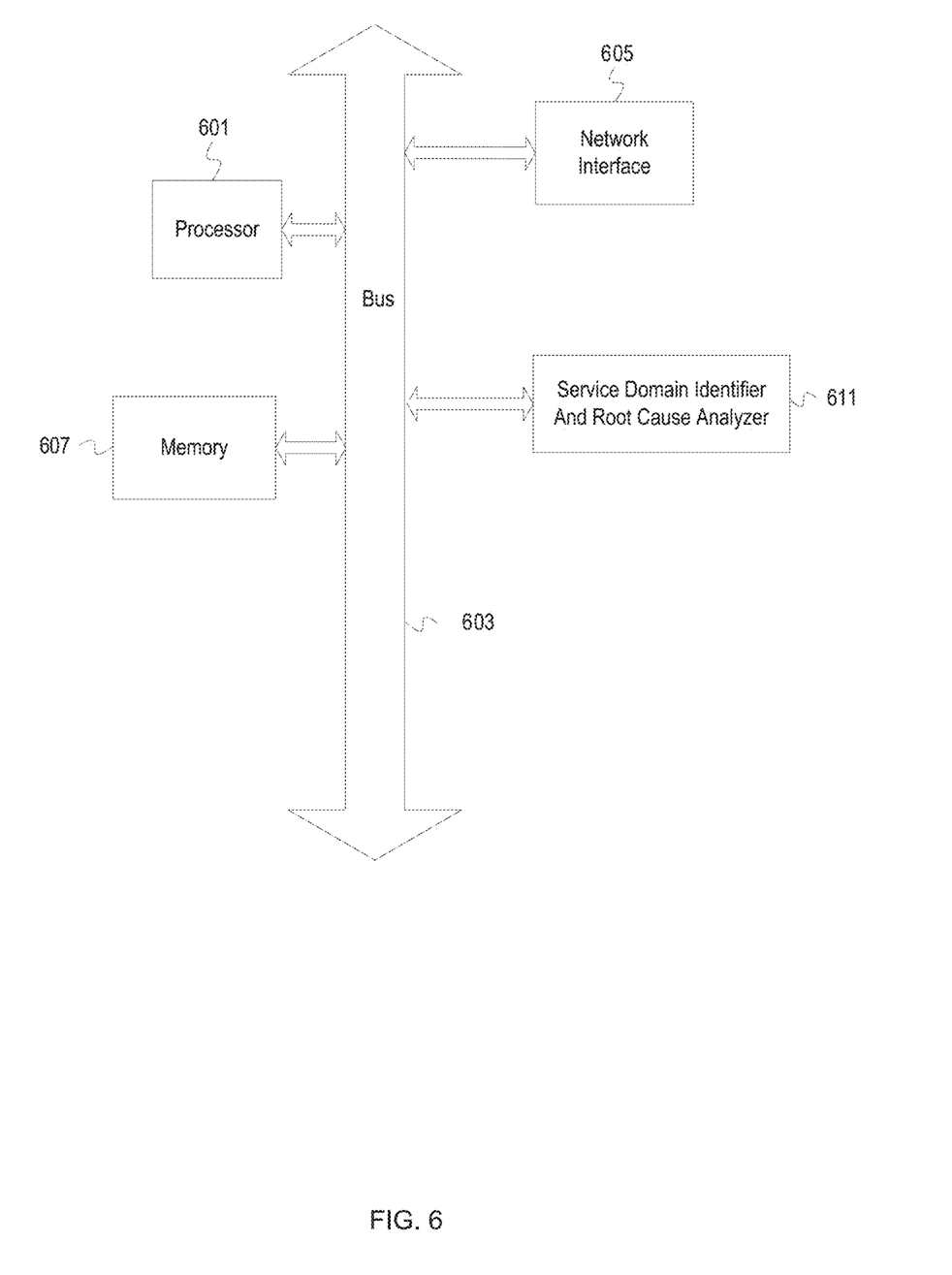
FIG. 6 depicts an example computer system with a service domain identifier and root cause analyzer.

FIG. 6 depicts an example computer system with a service domain identifier and root cause analyzer. The computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.). The system also includes a service domain identifier and root cause analyzer 611. The a service domain identifier and root cause analyzer 611 performs event-based identification of service domains and utilizes knowledge of the service domains in performing root cause analysis. Any one of the previously described functionalities may be partially (or entirely) implemented in hardware and/or on the processor unit 601. For example, the functionality may be implemented with an application specific integrated circuit, in logic implemented in the processor unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601 and the network interface 605 are coupled to the bus 603. Although illustrated as being coupled to the bus 603, the memory 607 may be coupled to the processor unit 601.

While the aspects of the disclosure are described with reference to various implementations and exploitations, it will be understood that these aspects are illustrative and that the scope of the claims is not limited to them. In general, techniques for event-based identification of service domains and root cause analysis as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
correlating events generated in a network to identify components of a service domain,
wherein correlating the events generated in the network to identify components of the service domain comprises,
generating a first covariance matrix with entries indicating a covariance of events between components in the network;
identifying the entries in the first covariance matrix which exceed a threshold; and
indicating components corresponding to the entries in the first covariance matrix which exceed the threshold as the components of the service domain;
based on detecting a first event indicating an issue at a first component in the service domain, retrieving a first set of event notifications indicating events occurring at the components within the service domain; and
identifying a root cause of the issue at the first component based, at least in part, on the components indicated in the service domain and the first set of event notifications.

2. The method of claim 1, wherein identifying the root cause of the first event based, at least in part, on the components indicated in the service domain and the first set of event notifications comprises:
identifying anomalous events in the first set of event notifications;
identifying a lowest layer component of the service domain which experienced a second event of the identified anomalous events; and
indicating the second event as the root cause of the issue at the first component.

3. The method of claim 2 further comprising:
identifying component types of the components in the service domain; and assigning the components to layers based, at least in part, on the component types of the components in the service domain.

4. The method of claim 1, wherein identifying the root cause of the first event based, at least in part, on the components indicated in the service domain and the first set of event notifications comprises:
  identifying a sequentially first event indicated in an event sequence associated with the service domain;
  identifying a second event in the first set of event notifications which matches the sequentially first event indicated in the event sequence; and
  indicating the second event as the root cause of the issue at the first component.

5. The method of claim 1, wherein correlating the events generated in the network to identify components of the service domain comprises:
  identifying a repeated event sequence in the events generated in the network; and indicating components corresponding to the event sequence as the components of the service domain.

6. The method of claim 1 further comprising:
  generating a set of covariance matrices over multiple operational periods of the components in the network; and
  validating the entries in the first covariance matrix which exceed the threshold based, at least in part, on entries in the set of covariance matrices generated over the multiple operational periods.

7. The method of claim 1 further comprising generating a graph data structure to represent the components of the service domain, wherein the graph data structure comprises nodes to represent the components and edges to indicate relationships between the components.

8. The method of claim 1 further comprising suppressing generation of event notifications for the components in the service domain based, at least in part, on identifying the root cause of the issue at the first component.

9. The method of claim 8 further comprising, after determining that the issue at the first component has been resolved, resuming generation of event notifications for the components in the service domain.

10. An apparatus comprising: a processor; and
  a machine-readable medium having program code executable by the processor to cause the apparatus to,
    correlate events generated in a network to identify components of a first service domain, wherein the program code to correlate events generated in a network to identify components of the first service domain comprises program code executable by the processor to cause the apparatus to, generate a first covariance matrix with entries indicating a covariance of events between the components in the network;
    identify the entries in the first covariance matrix which exceed a threshold; and indicate the components corresponding to the entries in the first covariance matrix which exceed the threshold as components in the first service domain;
    detect a first event indicating an issue at a first component in the network; based, at least partly, on the first event, identify at least the first service domain which comprises the first component; and
    identify a root cause of the issue at the first component based, at least in part, on the components indicated being in the first service domain.

11. The apparatus of claim 10 further comprising program code to:
  identify a second service domain which comprises the first component; and suppress generation of event notifications for the components in the first service domain and components in the second service domain until the issue at the first component is resolved.

12. The apparatus of claim 10, wherein the program code to identify the root cause of the first event based, at least in part, on the components indicated in the first service domain:
  retrieve a first set of event notifications for anomalous events occurring at the components in the first service domain;
  identify a lowest layer component of the first service domain which experienced a second event indicated in the first set of event notifications; and
  indicate the second event as the root cause of the issue at the first component.

13. The apparatus of claim 12 further comprising program code to:
  identify component types of the components in the first service domain; and assign the components in the first service domain to layers based, at least in part, on the component types of the components in the first service domain.

14. The apparatus of claim 10, wherein the program code to identify the root cause of the first event based, at least in part, on the components indicated in the first service domain:
  identify a sequentially first event indicated in an event sequence associated with the first service domain;
  identify a second event occurring at one of the components in the first service domain which matches the sequentially first event indicated in the event sequence; and
  indicate the second event as the root cause of the issue at the first component.

15. The apparatus of claim 10, wherein the program code to correlate events generated in a network to identify components of one or more service domains comprises program code to:
  identify one or more event sequences in the events generated in the network; and generate a service domain for each of the identified event sequences which correspond to different sets of components.

16. The apparatus of claim 10 further comprising program code to suppress generation of event notifications for the components in the service domain based, at least in part, on identifying the root cause of the issue at the first component.

17. One or more non-transitory machine-readable media comprising program code, the program code to:
  correlate events generated in a network to identify components of a service domain, wherein the program code to correlate the events generated in the network to identify components of the service domain comprises program code to,
    generate a first covariance matrix with entries indicating a covariance of events between components in the network;
    identify the entries in the first covariance matrix which exceed a threshold; and
    indicate components corresponding to the entries in the first covariance matrix which exceed the threshold as the components of the service domain;
  based on detection of a first event indicating an issue at a first component in the service domain, retrieve a first set of event notifications indicating events occurring at the components within the service domain; and
  identify a root cause of the issue at the first component based, at least in part, on the components indicated in the service domain and the first set of event notifications.

18. The non-transitory machine-readable media of claim 17, wherein the program code to identify the root cause of the first event based, at least in part, on the components indicated in the service domain and the first set of event notifications comprises program code to:
- identify anomalous events in the first set of event notifications;
- identify a lowest layer component of the service domain which experienced a second event of the identified anomalous events; and
- indicate the second event as the root cause of the issue at the first component.

19. The non-transitory machine-readable media of claim 18 further comprising program code to:
- identify component types of the components in the service domain; and
- assign the components to layers based, at least in part, on the component types of the components in the service domain.

20. The non-transitory machine-readable media of claim 17, wherein the program code to identify the root cause of the first event based, at least in part, on the components indicated in the service domain and the first set of event notifications comprises program code to:
- identify a sequentially first event indicated in an event sequence associated with the service domain;
- identify a second event in the first set of event notifications which matches the sequentially first event indicated in the event sequence; and
- indicate the second event as the root cause of the issue at the first component.

21. The non-transitory machine-readable media of claim 17, wherein the program code to correlate the events generated in the network to identify components of the service domain comprises program code to:
- identify a repeated event sequence in the events generated in the network; and indicate components corresponding to the event sequence as the components of the service domain.

* * * * *